United States Patent
Almerico

(10) Patent No.: US 11,231,137 B2
(45) Date of Patent: Jan. 25, 2022

(54) SUBSEA FLOWLINE BLOCKAGE REMEDIATION USING EXTERNAL HEATING DEVICE

(71) Applicant: Oceaneering International, Inc., Houston, TX (US)

(72) Inventor: Sam Almerico, The Woodlands, TX (US)

(73) Assignee: Oceaneering International, Inc., Houston, TX (US)

( * ) Notice: Subject to any disclaimer, the term of this patent is extended or adjusted under 35 U.S.C. 154(b) by 402 days.

(21) Appl. No.: 16/412,075

(22) Filed: May 14, 2019

(65) Prior Publication Data

US 2019/0346078 A1 Nov. 14, 2019

Related U.S. Application Data

(60) Provisional application No. 62/671,338, filed on May 14, 2018.

(51) Int. Cl.
*F16L 53/38* (2018.01)

(52) U.S. Cl.
CPC .................................. *F16L 53/38* (2018.01)

(58) Field of Classification Search
CPC .................................. F16L 1/123; F16L 53/38
USPC ....... 392/301, 480, 304, 320, 321, 469, 314, 392/315, 318, 481, 478, 479; 219/772, 219/770, 778, 780, 774; 166/248, 60, 166/302; 137/341
See application file for complete search history.

(56) References Cited

U.S. PATENT DOCUMENTS

| 6,509,557 | B1 * | 1/2003 | Bass | H05B 6/108 |
| | | | | 219/772 |
| 2008/0236810 | A1 * | 10/2008 | Bornes | E21B 43/01 |
| | | | | 166/61 |
| 2008/0251668 | A1 * | 10/2008 | Stokes | F16L 3/1211 |
| | | | | 248/230.4 |
| 2013/0014833 | A1 * | 1/2013 | Geertsen | H05B 6/56 |
| | | | | 137/341 |
| 2013/0213487 | A1 * | 8/2013 | Qu | F16L 53/38 |
| | | | | 137/13 |
| 2018/0023767 | A1 * | 1/2018 | Delaunay | F16L 7/02 |
| | | | | 138/33 |

FOREIGN PATENT DOCUMENTS

WO    WO-2017143389 A1 *  8/2017 ............... H02G 9/02

* cited by examiner

*Primary Examiner* — Dana Ross
*Assistant Examiner* — Ket D Dang
(74) *Attorney, Agent, or Firm* — Maze IP Law, P.C.

(57) ABSTRACT

External heating assembly 1 is usable to heat subsea flowline 100 and remediate a blockage in subsea flowline 100 and comprises a predetermined set of heaters 10; one or more conductive layers 20 configured to uniformly distribute heat over an exterior of subsea flowline 100; one or more insulating layers 30 adapted to shield subsea flowline 100, the predetermined set of heaters 10, and conductive layers 20 from ambient seawater temperature; an anchor; and a strength member. The predetermined set of heaters 10 may comprise one or more mineral insulated cables capable of reaching very high temperatures with very little power and minimal controls.

18 Claims, 4 Drawing Sheets

SUBSEA FLOWLINE BLOCKAGE REMEDIATION USING EXTERNAL HEATING DEVICE

RELATION TO OTHER APPLICATIONS

This application claims priority through U.S. Provisional Application 62/671,338 filed on May 14, 2018.

BACKGROUND

Existing remediation methods for externally heating a subsea flowline have, to this point, been largely unsuccessful. Most heating methods only cover a short distance or require a lot of power.

FIGURES

Various figures are included herein which illustrate aspects of embodiments of the disclosed inventions.

DESCRIPTION OF EXEMPLARY EMBODIMENTS

Figure 1:
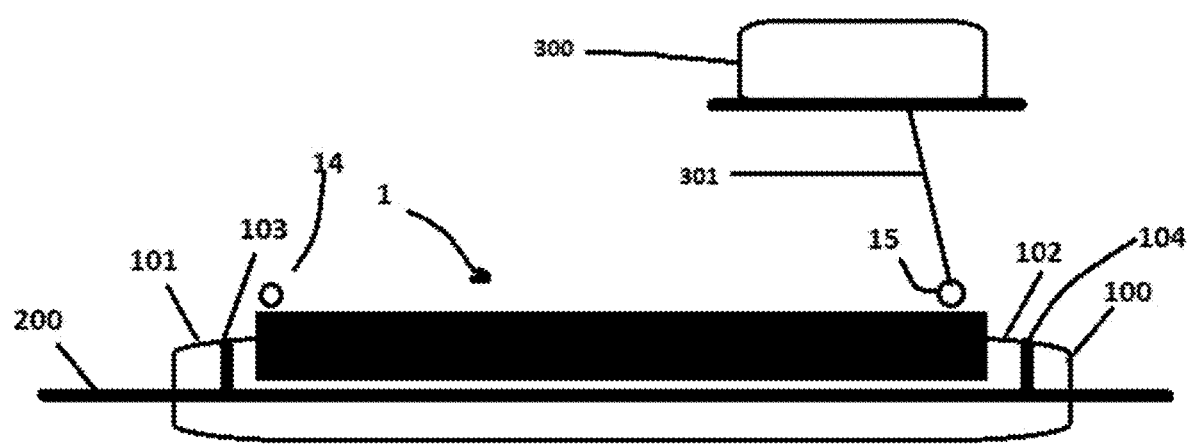
FIG. 1 is a block diagram of the claimed invention.
Figure 2:
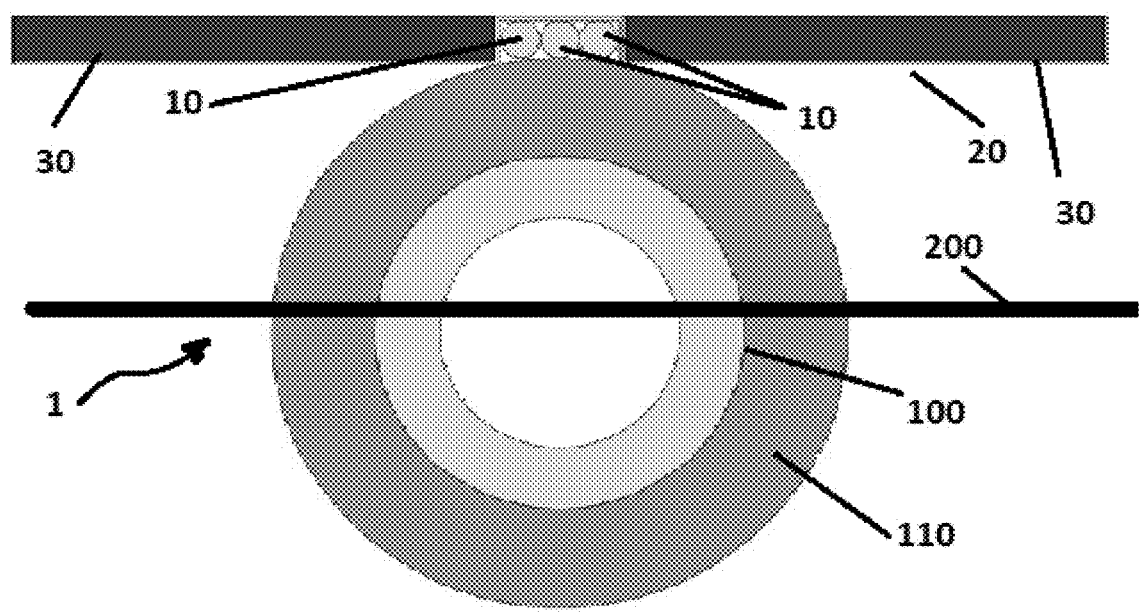
FIG. 2 is a cross-section view in partial perspective of an exemplary embodiment of the claimed invention.
Figure 3:
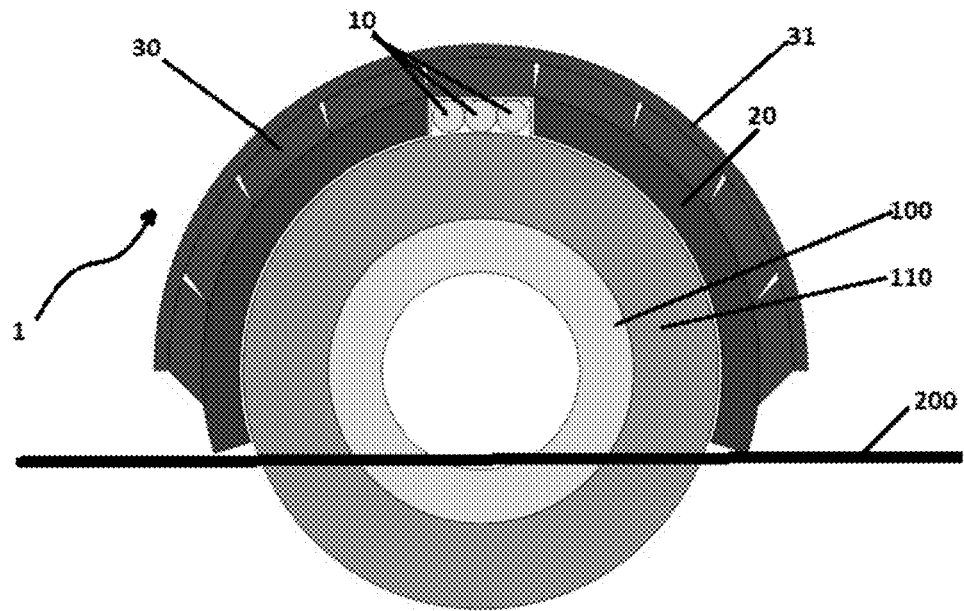
FIG. 3 is a cross-section view in partial perspective of a further exemplary embodiment of the claimed invention.

In a first embodiment, referring generally to FIG. 1, external heating assembly 1, which is usable to heat subsea flowline 100, which may comprise flowline insulation 110, disposed subsea to remediate blockages, comprises a first end 101; second end 102 disposed distally from first end 101; a predetermined set of heaters 10 (FIG. 2) disposed between first end 101 and second end 102 proximate subsea flowline 100; one or more conductive layers 20 (FIG. 2) disposed between first end 101 and second end 102 about an exposed surface of subsea flowline 100 and further about a predetermined portion of the predetermined set of heaters 10 so as to not preclude access to the exposed surface of subsea flowline 100 by the predetermined set of heaters 10 where conductive layers 20 are configured to uniformly distribute heat over an exterior of subsea flowline 100; one or more insulating layers 30 (FIG. 2) disposed between first end 101 and second end 102 about conductive layers 20 away from subsea flowline 100 where insulating layers 30 are adapted to shield subsea flowline 100, the predetermined set of heaters 10, and conductive layers 20 from ambient seawater temperature and where at least one insulating layer 30 comprises an insulating blanket, comprising an insulating material which can withstand hydrostatic forces; an anchor comprising first clamp 103 disposed at or proximate to first end 101 and second clamp 104 disposed at or proximate to second end 102, where first clamp 103 and second clamp 104 are adapted to provide a clamping force to secure external heating assembly 1 to subsea flowline 100; and strength member 105 (not shown in the figures) terminated at first clamp 103 and second clamp 104, where strength member 105 is adapted to provide structural strength for lifting external heating assembly 1.

In embodiments, the predetermined set of heaters 10 may further comprise one or more heat trace cables 11 (not shown in the figures but basically as illustrated at callout 10), by way of example and not limitation three such cables. In such embodiments, external heating assembly 1 typically further comprises electrical terminations 14,15, one on each end of the predetermined set of heaters 10, where electrical terminations 14,15 are operatively in electrical communication with heat trace cable 11. Electrical terminations 14,15 may be housed in the anchor.

In embodiments, the predetermined set of heaters 10 may also comprise one or more mineral insulated cables 13 (not shown in the figures but basically as illustrated at callout 10) further comprising a corrosion resistant exterior, by way of example and not limitation three such cables. In these embodiments, external heating assembly 1 typically comprises electrical terminations 14,15, one on each end of the predetermined set of heaters 10, where electrical terminations 14,15 are operatively in electrical communication with mineral insulated cable 13. Mineral insulated cable 13 is typically capable of reaching very high temperatures with very little power and minimal controls.

Where present, electrical termination 14 on first end 103 may be shorted, with or without electrical resistors, and electrical termination 15 on second end 104 may be terminated to a subsea wet-mate electrical connector (not shown in the figures).

In other embodiments, the predetermined set of heaters 10 comprise heated fluid disposed within conduit 12.

In certain embodiments, referring additionally to FIGS. 2-5, the predetermined set of heaters 10 comprise a plurality, e.g. three, separate heating cables 10. In these embodiments, the plurality of separate heating cables are typically evenly distributed over a top half of subsea flowline 100 and may further be in contact with each other on the exterior of subsea flowline 100.

Conductive layer 20 is used to evenly disperse heat generated by the predetermined set of heaters 10 over a portion, e.g. the top, of subsea flowline 100. This enables the predetermined set of heaters 10. Without it, the heat from the predetermined set of heaters 10 may not be sufficient to remediate blockages.

Figure 4:
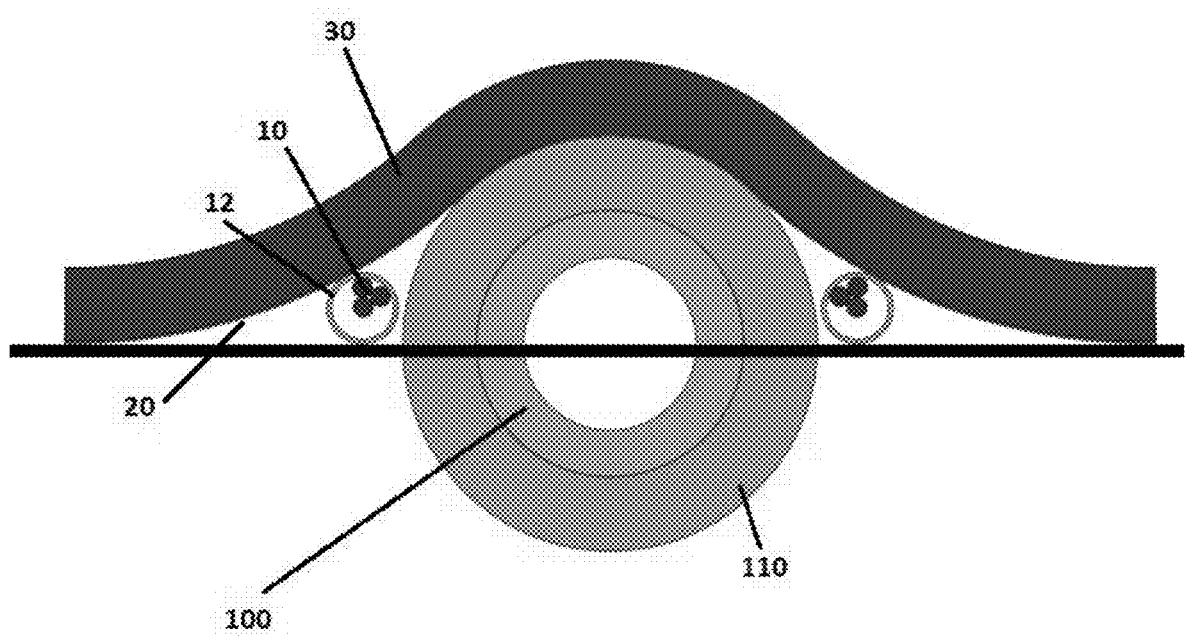
FIG. 4 is a cross-section view in partial perspective of a further exemplary embodiment of the claimed invention.

Referring additionally to FIG. 4, external heating assembly 1 may comprise one or more conduits 12 within which the predetermined set of heaters 10 may be disposed. These conduits 12 may comprise a coiled tubing assembly which is laid on seabed 200 adjacent to subsea flowline 100. In embodiments, the coiled tubing assembly may be disposed on a seabed adjacent to conductive layer 20 and may be laid on seabed 200 at a substantial length by itself.

If conduits 12 are present, the predetermined set of heaters 10 may comprise or be surrounded by heated fluid disposed within conduit 12. Further, one or more blankets 100 comprising insulating layer 20 and conductive layer 30 may be laid on top of subsea flowline 100 after installation of the coiled tubing assembly.

Figure 5:
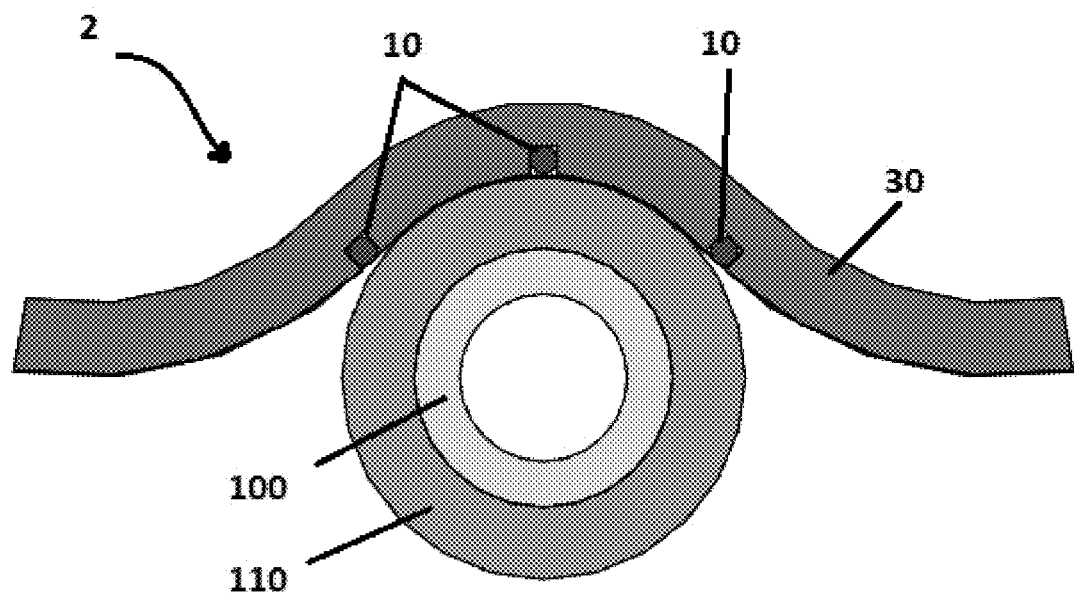
FIG. 5 is a cross-section view in partial perspective of a further exemplary embodiment of the claimed invention and FIG. 5A is a closeup view of that embodiment.
Figure 5A:
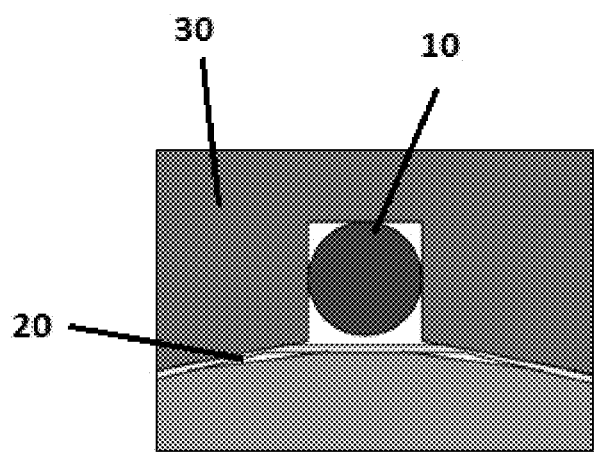
Figure 6:
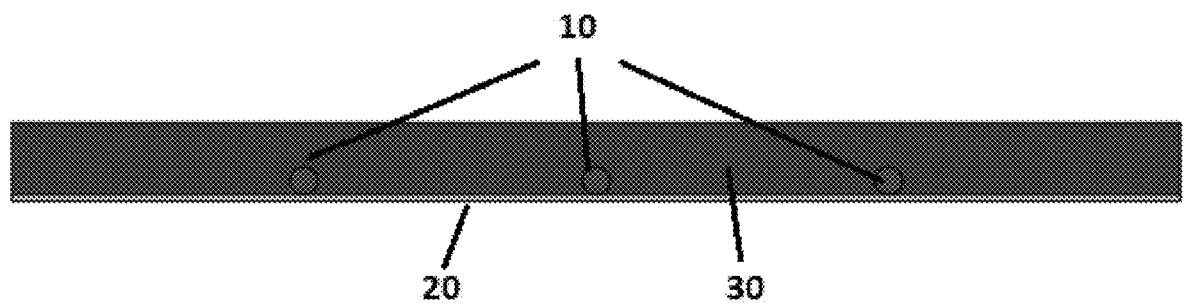
FIG. 6 is a view in partial perspective of a further exemplary embodiment of the claimed invention.

Referring additionally to FIG. 5, in embodiments the predetermined set of heaters 10 may be imbedded in insulating layer 30 and may further be covered with and bonded to conductive layer 20 (FIG. 5A).

Figure 7:
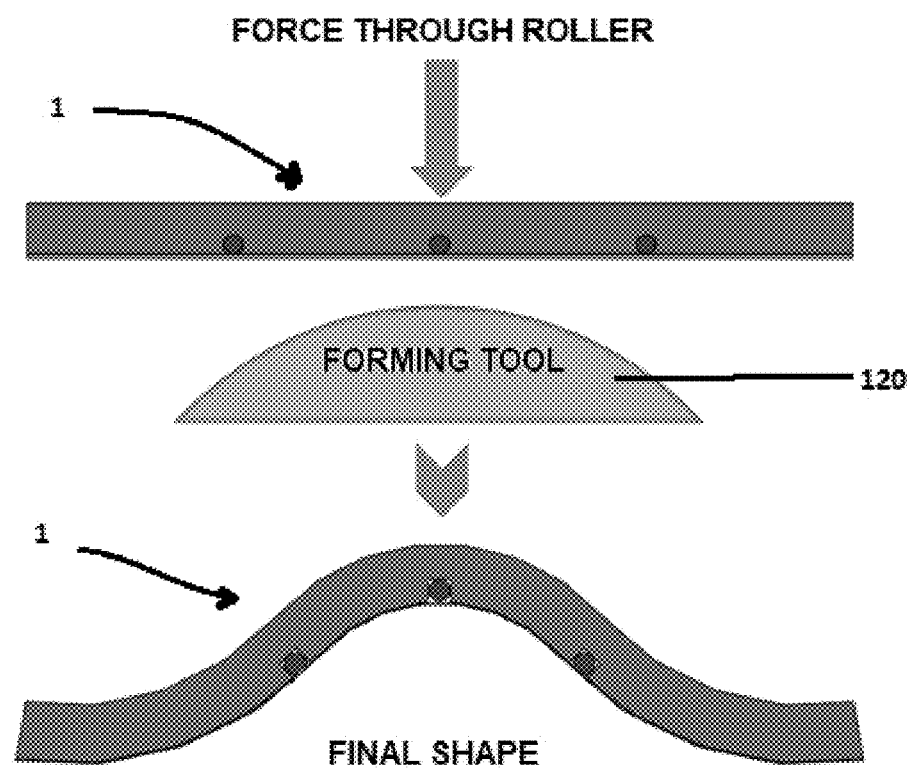
FIG. 7 is a block diagram showing formation of an exemplary embodiment of the claimed invention.

In contemplated embodiments, referring to FIG. 7, external heating assembly 1 may be formed to conform to a shape of the exterior surface of subsea flowline subsea 100, such as with forming device 120. This forming may occur during deployment, prior to entering the sea, with a forming device on the deck of a vessel (not shown in the figures). Alternatively, external heating assembly 1 may be formed to a shape of the exterior surface of subsea flowline 100 during deployment, near the subsea flowline, after entering the sea, with forming device 120 on subsea flowline 100.

In any of these embodiments, external heating assembly 1 may further comprise a conductive fluid, such as a gel, grease, or the like, or a combination thereof, disposed between, and adapted to maintain contact with, conductive layer 20 and subsea flowline 100.

In the operation of exemplary methods, referring back to FIGS. 1 and 2, external heating assembly 1 may be constructed by laying a predetermined set of mineral insulated cables 10, typically laid flat side by side, on a top surface of subsea flowline 100; forming one or more conductive layers 20 around mineral insulated cables 10, initially with one or more primary insulation layers 30; forming external heating assembly 1 into a shape of subsea flowline 100, either topside or subsea; and placing the formed external heating assembly 1 onto subsea flowline 100.

In certain embodiments, a secondary insulation blanket 31 (FIG. 3) may be placed over the formed external heating assembly 1 for additional insulation.

In embodiments, the predetermined set of mineral insulated cables comprises a plurality of mineral insulated cables 10, e.g. three, which are embedded or contained within an inner surface of insulation layer 30 closest to subsea flowline 100 and spaced so that they will be equally dispersed over the top surface of subsea flowline 100 after installation.

Where a plurality of mineral insulated cables 10 is present, these mineral insulated cables 10 may further be placed inside coiled tubing 12 comprising a substantial length, i.e. a length which deploys over more than a minimum longitudinal area of subsea flowline 100, to form a coiled tubing assembly and conductive layer 20 and insulation layer 30 bonded together to form a flat blanket of varying length, in either short pieces or in a long continuous length roll. The coiled tubing assembly may be laid on seabed 200 near subsea flowline first 100, e.g. first, and external heating assembly 1 formed into the shape of subsea flowline, either topside or subsea, and then placed onto subsea flowline 100.

In further embodiments, a blockage in subsea flowline 100 may be remediated by disposing external heating assembly 1, which is as described above, proximate subsea flowline 100. Electrical power may be provided to the predetermined set of heating cables 10 such as using remotely operated vehicle 300 or other source of electrical power such as a topside vessel (not shown in the figures) or subsea power supply (not shown in the figures), via electrical umbilical 301. The electrical power then energizes the predetermined set of heaters 10 which provide heat to subsea flowline 100.

The anchor, described above, is typically disposed at each end 101,102 to provide a clamping force to subsea flowline 100. In addition, the anchor may be used to provide an anchoring force to seabed 200.

In other embodiments, a weight device (not shown in the figures), e.g. concrete mattress or self-weight ballast or the like or a combination thereof, may be used to provide a holding force downward on external heating assembly 1 to keep external heating assembly 1 in contact with subsea flowline 100.

In embodiments, as illustrated in FIG. 7, external heating assembly 1 may be formed to a shape of an exterior surface of subsea flowline 100 subsea with forming device 120 prior to or during deployment, prior to entering the sea, with forming device 120 on the deck of a vessel or formed during deployment, near the subsea flowline, after entering the sea, with forming device 120 on subsea flowline 100.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. An external heating assembly usable to heat a subsea flowline subsea to remediate blockages, comprising:
   a. a first end;
   b. a second end disposed distally from the first end;
   c. a predetermined set of heaters adapted to be disposed proximately and externally to, and longitudinally along, an exposed exterior surface of a subsea flowline between the first end and the second end;
   d. a conductive layer disposed between the first end and the second end and adapted to be disposed about the exposed portion of an exterior surface of the subsea flowline and about a predetermined portion of the predetermined set of heaters so as to not preclude access to the exposed portion of the exterior surface of the subsea flowline by the predetermined set of heaters, the conductive layer configured to uniformly distribute heat over the exterior of the subsea flowline;
   e. an insulating layer disposed between the first end and the second end about the conductive layer and configured to be disposed the conductive layer away from the subsea flowline, the insulating layer adapted to shield the subsea flowline, the predetermined set of heaters, and the conductive layer from ambient seawater temperature, the insulating layer comprising an insulating blanket comprising an insulating material which can withstand a predetermined set of hydrostatic forces;
   f. a first clamp disposed at the first end;
   g. a second clamp disposed at the second end, the first clamp and the second clamp adapted to provide a clamping force sufficient to secure the external heating assembly to the subsea flowline; and
   h. a strength member terminated at the first clamp and the second clamp, the strength member adapted to provide structural strength for lifting the external heating assembly.

2. The external heating assembly of claim 1 wherein:
   a. the predetermined set of heaters comprises a heat trace cable; and
   b. the external heating assembly comprises an electrical termination on each end of the predetermined set of heaters, the electrical terminations operatively in electrical communication with the heat trace cable.

3. The external heating assembly of claim 1 wherein:
   a. the predetermined set of heaters comprises a mineral insulated cable further comprising a corrosion resistant exterior; and
   b. the external heating assembly comprises an electrical termination on each end of the predetermined set of heaters, the electrical terminations operatively in electrical communication with the mineral insulated cable.

4. The external heating assembly of claim 3 wherein:
   a. the electrical termination on the first end is shorted; and
   b. the electrical termination on the second end is terminated to a subsea wet-mate electrical connector.

5. The external heating assembly of claim 1 wherein the predetermined set of heaters comprises three separate heating cables.

6. The external heating assembly of claim 5 wherein the three separate heating cables are evenly distributed over a top half of the subsea flowline.

7. The external heating assembly of claim 5 wherein the three separate heating cables are in contact with each other on the exterior surface of the subsea flowline.

8. The external heating assembly of claim 1 wherein the predetermined set of heaters is imbedded in the insulating layer.

9. The external heating assembly of claim 1 wherein the predetermined set of heaters and the insulating layer are covered with and bonded to the conductive layer.

10. The external heating assembly of claim 1 wherein the external heating assembly is formed to a shape of the exterior surface of the subsea flowline subsea with a forming device.

11. The external heating assembly of claim 1 wherein the external heating assembly is formed to a shape of the exterior surface of the flowline during deployment, prior to entering the sea, with a forming device on the deck of a vessel.

12. The external heating assembly of claim 1 wherein the external heating assembly is formed to a shape of the exterior surface of the subsea flowline during deployment, near the subsea flowline or after entering the sea, with a forming device on the subsea flowline.

13. The external heating assembly of claim 1 wherein:
a. the external heating assembly further comprises a conduit; and
b. the predetermined set of heaters is disposed within the conduit.

14. The external heating assembly of claim 13 wherein the conduit comprises a coiled tubing assembly adapted to be disposed on a seabed adjacent to the subsea flowline.

15. The external heating assembly of claim 14 wherein the coiled tubing assembly is further configured to be disposed on the seabed adjacent to the conductive layer.

16. The external heating assembly of claim 14, wherein the predetermined set of heaters comprises a fluid disposed within the conduit, the fluid adapted to be heated within the conduit.

17. The external heating assembly of claim 14 wherein further comprising a blanket comprising the insulating layer and conductive layer, the blanket configured be to laid on top of the subsea flowline after installation of the coiled tubing assembly.

18. The external heating assembly of claim 1 further comprising a conductive fluid disposed between, and adapted to maintain contact with, the conductive layer and the subsea flowline.

* * * * *